UNITED STATES PATENT OFFICE.

ARTHUR WEINBERG, OF FRANKFORT-ON-THE-MAIN, GERMANY, ASSIGNOR TO LEOPOLD CASSELLA & CO., OF FRANKFORT-ON-THE-MAIN, GERMANY.

YELLOW ACRIDIN DYE AND PROCESS OF MAKING SAME.

SPECIFICATION forming part of Letters Patent No. 709,187, dated September 16, 1902.

Application filed January 14, 1902. Serial No. 89,793. (Specimens.)

*To all whom it may concern:*

Be it known that I, ARTHUR WEINBERG, a citizen of Prussia, and a resident of Frankfort-on-the-Main, in the Province of Hesse-Nassau and Kingdom of Prussia, Germany, have invented certain new and useful Improvements in the Production of Yellow Acridin Dyes and Processes of Making the Same, of which the following is a specification.

My invention relates to the manufacture of new acridin dyestuffs, which can be obtained by heating diamido acridin or analogous substances or their leuco compounds together with aromatic amins or diamins and formaldehyde. The most important acridin dyestuff which may be subjected to the said process is the so-called "acridin yellow," of the formula

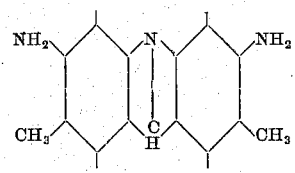

and also those of its derivatives in which one amido group or both amido groups are alkylated. The most suitable amins which may be combined with the said compounds by means of formaldehyde are anilin, mono and di alkylanilin o.toluidin, monoalkyltoluidin, metaphenylenediamin, metatoluylenediamin, and dimethylmetaphenylenediamin.

The following examples illustrate how this invention may be carried out:

Example I: 25.6 kilos tetraämidoditolylmethane are heated in an autoclave, together with ninety kilos hydrochloric acid of 21° Baumé and two hundred and seventy liters water, during seven hours to 145° to 150° centigrade. After cooling, the vessel is opened and 9.5 kilos anilin and 8.2 kilos of a solution of formaldehyde (thirty-eight per cent.) are added. The autoclave is then closed again and heating continued for about two hours to 105° to 110° centigrade. The thus-formed product of condensation is easily soluble in water. The dyestuff is precipitated from the solution by means of common salt. It is thus obtained partly in the form of its leuco compound, which already in contact with the oxygen of the air is transformed into the dyestuff. It dyes cotton mordanted with tannin and leather fast reddish-yellow shades.

Example II: To the solution of acridin yellow obtained as per Example I, 6.3 kilos dimethylanilin and 8.2 kilos of a solution of formaldehyde (thirty-eight per cent.) are added and the melt heated in a closed vessel during six hours to about 130° centigrade. The dyestuff is precipitated from the solution by means of common salt. It is easily soluble in water and dyes cotton mordanted with tannin as well as leather a somewhat more reddish-yellow than the dyestuff of Example I.

The thus-produced dyestuffs show the following reactions: They are brownish powders easily soluble in water and alcohol with a yellow color, the alcoholic solution showing a green fluorescence. They dissolve in concentrated sulfuric acid with a yellow or orange color. On addition of water the dyestuffs remain dissolved with an orange shade. They dye unmordanted cotton fast yellow shades.

Having thus described my invention and in what manner it may be carried out, what I claim is—

1. The process of producing new acridin dyestuffs by heating acridin compounds of the formula $C_{15}H_{11}N.(NX)_2$ where X means hydrogens or alcoyls, or the corresponding leuco derivatives, together with aromatic amins and formaldehyde substantially as described.

2. As a new article of manufacture the coloring-matter which can be obtained by the condensation of acridin yellow, formaldehyde and aromatic amins, and which dissolves in water with a yellow shade, in alcohol with a yellow shade showing a green fluorescence, in diluted mineral acids with an orange shade, and which dyes tanned cotton fast yellow shades substantially as described.

Signed at Frankfort-on-the-Main, in the Province of Hesse-Nassau and Kingdom of Prussia, this 28th day of December, A. D. 1901.

ARTHUR WEINBERG.

Witnesses:
  JEAN GRUND,
  CARL GRUND.